(12) United States Patent
Buch

(10) Patent No.: US 8,122,308 B2
(45) Date of Patent: Feb. 21, 2012

(54) SECURELY CLEARING AN ERROR INDICATOR

(75) Inventor: Deep Buch, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 870 days.

(21) Appl. No.: 12/215,182

(22) Filed: Jun. 25, 2008

(65) Prior Publication Data

US 2009/0327638 A1 Dec. 31, 2009

(51) Int. Cl.
- *G06F 11/00* (2006.01)
- *G11C 29/00* (2006.01)
- *G08C 25/00* (2006.01)
- *H03M 13/00* (2006.01)
- *H04L 1/00* (2006.01)

(52) U.S. Cl. .......................... 714/723; 714/703; 714/746

(58) Field of Classification Search ........................ None
See application file for complete search history.

(56) References Cited

U.S. PATENT DOCUMENTS

| | | | | |
|---|---|---|---|---|
| 5,629,950 A | * | 5/1997 | Godiwala et al. | 714/805 |
| 5,987,628 A | * | 11/1999 | Von Bokern et al. | 714/48 |
| 6,463,522 B1 | * | 10/2002 | Akkary | 712/216 |
| 6,594,785 B1 | * | 7/2003 | Gilbertson et al. | 714/48 |
| 6,678,837 B1 | * | 1/2004 | Quach et al. | 714/38.13 |
| 6,880,069 B1 | * | 4/2005 | Carmean et al. | 712/227 |
| 6,948,094 B2 | * | 9/2005 | Schultz et al. | 714/15 |
| 7,103,751 B1 | * | 9/2006 | Toll et al. | 711/220 |
| 7,177,989 B1 | * | 2/2007 | McGinnis | 711/151 |
| 7,237,156 B1 | * | 6/2007 | Srinivasan et al. | 714/719 |
| 7,290,179 B2 | * | 10/2007 | Lempel et al. | 714/42 |
| 7,346,825 B2 | * | 3/2008 | Rankin et al. | 714/752 |
| 7,415,633 B2 | * | 8/2008 | Jamil et al. | 714/17 |
| 2003/0070121 A1 | * | 4/2003 | Mori et al. | 714/42 |
| 2006/0026380 A1 | * | 2/2006 | Doi et al. | 711/207 |
| 2007/0168794 A1 | * | 7/2007 | Roohparvar | 714/724 |
| 2007/0220354 A1 | * | 9/2007 | Moyer | 714/42 |
| 2008/0301529 A1 | * | 12/2008 | Spanel et al. | 714/765 |
| 2008/0301530 A1 | * | 12/2008 | Spanel et al. | 714/765 |
| 2009/0055680 A1 | * | 2/2009 | Honda et al. | 714/5 |

* cited by examiner

*Primary Examiner* — Jeffrey A Gaffin
*Assistant Examiner* — Guerrier Merant

(57) ABSTRACT

In one embodiment, a controller can perform a secure clear of a poisoned indicator associated with an uncorrectable error (after recovery from the error). To this end, the controller may access a register storing an address of a memory location associated with indicator, determine whether the address corresponds to an entry in a table storing a list of such errors, and perform the clear based at least in part on the determination. Other embodiments are described and claimed.

20 Claims, 4 Drawing Sheets

SECURELY CLEARING AN ERROR INDICATOR

BACKGROUND

In modern computer systems when data is determined to be erroneous, the error status can be identified with a bit or other indication that is associated with the data. In some systems this indicator is referred to as a "poison" bit. If a memory controller receives write data with a poison indication set, it stores that data in memory together with a set poison status indicator. This data may originate from various locations in a system such as an agent or a processor core/last level cache (LLC) writeback. If the memory controller observes uncorrected error correction coding (ECC) on a read, it may write back a poison signature into that memory location and set a poison indicator before forwarding the read data, and log an uncorrected error in machine check banks.

In some processors, if an uncorrectable ECC error or a poison status is detected on reading a memory location, a fatal machine check error is signaled and the operating system (OS) bug-checks and the system resets. This behavior is undesirable for high-availability consolidated servers running multiple virtual machines, as a single hardware fault can bring down the entire system.

DETAILED DESCRIPTION

Figure 1:
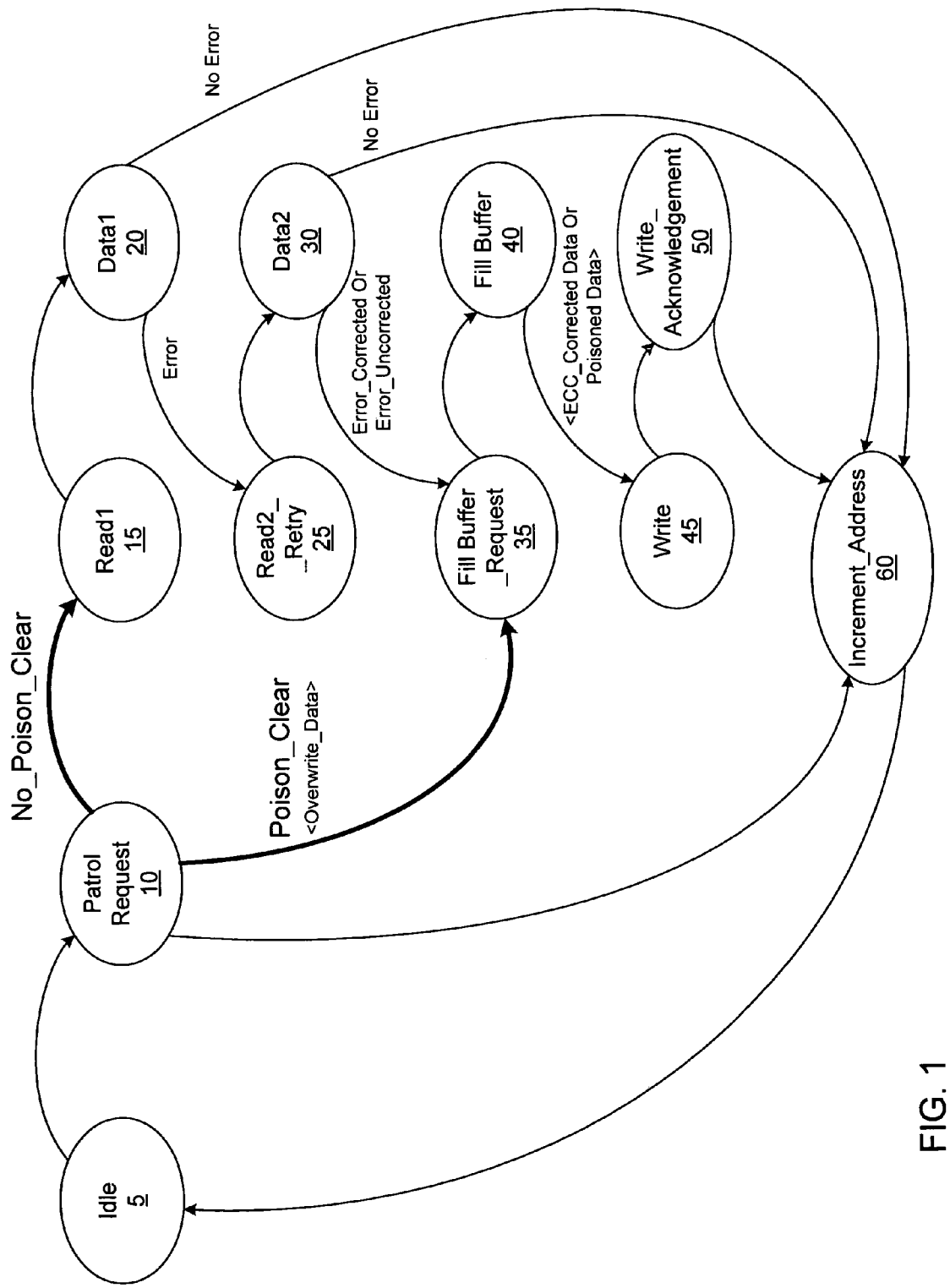
FIG. 1 is a state diagram of a patrol scrub engine in accordance with one embodiment of the present invention.

In various embodiments, an operating system (OS) that supports error recovery such as machine check error recovery after processing an error due to erroneous or poisoned data in memory may issue a request to clear the poisoned status of that data so that this memory location can now be re-used. A secure clear of such poisoned memory locations may be used to improve system performance.

In this context, "secure" refers to the ability to handle this clear in a manner that allows graceful handling of the clear. To this end, a secure clear can guarantee that a spurious or double exception will not be generated while attempting to clear the poison status. This is in contrast to a software-based clearing which cannot provide such guarantees. Such secure clearing is also done while error detection remains enabled for the duration of the poison clear operations. The secure clear also secures a register that controls the poison clear operation so that only basic input/output system (BIOS) in system management mode (SMM) can alter it. Finally, a secure clear ensures that only poisoned memory locations can be cleared using this technique, and that the hardware cannot be misused to overwrite arbitrary memory locations.

In various embodiments, a processor may provide for system-level recovery from errors. While the data itself cannot be corrected, system software can take steps to recover from a hardware-uncorrected error. These steps may include placing a memory page including the error on a list of "bad pages", terminating applications to which the page belongs, terminating an entire virtual machine (VM), or so forth. This operation potentially improves system availability as other virtual machines and applications can continue normally.

After such recovery, an OS or other system software may request the capability to clear the poison status to avoid repeated signaling of the same error, and to allow that memory location/page to be reused. The OS may first ensure that a memory page containing a poisoned line is no longer mapped to any application or process. Only after this does the OS request the platform to clear the poison status. The OS informs the BIOS of the physical address that needs a poison clear operation. The method of communication between OS and BIOS is platform specific. For example, communication methods can use a Windows™ hardware error architecture (WHEA) infrastructure to make a call to a platform specific hardware error driver (PSHED) plug-in, or use Advanced Configuration and Power Interface (ACPI) tables. As will be described below, secure BIOS may access a control register or other structure to register and handle this secure clear request.

In one embodiment, hardware enhancements to a patrol scrub engine of a memory controller, along with supporting software error handling flow may be used to support a secure poison clear operation. At a high level, a command is issued to hardware in the memory controller, which then clears the poison status. To provide a secure poison clear which guarantees that a spurious machine check exception will not be generated while attempting to clear the poison status, a register that controls the poison clear may be secured so that only BIOS in SMM mode can alter it. Embodiments may further ensure that only poisoned memory locations can be cleared using this technique, and that the hardware cannot be misused to overwrite arbitrary memory locations.

Instead of using dedicated hardware, in one embodiment a patrol scrub engine may be provided with various enhancements. A patrol scrub engine (a scrubber) is a state machine of a memory controller or other such controller that may be used to "scrub" data of an associated memory periodically. The scrubber is programmed by system software with a range of addresses to scrub, and a time interval between scrub events.

Referring now to FIG. 1, shown is a state diagram of a patrol scrub engine in accordance with one embodiment of the present invention. As shown in FIG. 1, when a scrub event fires (i.e., a patrol request is received), the patrol scrubber transitions from the idle state (item 5) to a patrol request state (10) and if no poison clear has been received for a current address, a read is issued (Read 1) (item 15) to the current address ("patrol read"). The ECC for data at this address (Data1) is checked (item 20) and if no error is found, the scrubber considers this scrub event complete, increments the address counter (Increment_Address) (item 60), and sleeps until a next event fires.

Thus where there is no error on Read1/Data1, the state machine (SM) transitions to Increment_Address where the patrol counter is incremented, and then returns to an idle state. In case of a read data error, the state machine performs a retry (Read2_Retry/Data2) (items 25 and 30). If the error was transient, then the SM transitions to Increment_Address as above. If the error is persistent, then an attempt is made to correct it (not shown for clarity). Corrected data with a proper ECC is then merged to a fill buffer, which may be a first-in-first-out (FIFO) or other temporary storage via a fill request 35 to a fill buffer (item 40), and a patrol write is issued (item 45). If data is uncorrectable, then data is written back with a poison indication and the SM then transitions to Increment_Address as before. If a correctable ECC error is found, the scrubber invokes ECC correction hardware, and writes the corrected data back to the memory location (at item 45), and which is followed by a write acknowledgment (ACK) state (item 50). If an uncorrected ECC error is found, and subsequent retries do not resolve the error, then the scrubber stops and signals an error.

If instead at state 10 a poison clear instruction is received, the patrol scrubber is directed to scrub the memory location in question, and skips the patrol read and related operations and executes only a patrol write, beginning with a fill buffer request at state 35. In this way, signaling a spurious exception can be avoided.

In various embodiments, a patrol request may thus include a field indicating whether a Poison_Clear is required. If so, an address field is loaded from a register and points to the desired memory location for which the poison status needs to be cleared. Thus if this Poison_Clear indicator is true, then the SM transitions directly to the write state. In one embodiment, overwrite data can be programmed in a register by system software, or it can simply be zero-fill. The fill buffer is loaded from this register for poison clear operations. Note that a correct ECC may be calculated for this overwrite data, just as it is for normal patrol scrub writes. When the overwrite data is written into the memory location, the poison status indicator for that memory location is cleared and an acknowledge (ACK) status bit is set in the register.

Various hardware capabilities may be used to enable a secure poison clear. The objective is to ensure that only poisoned memory locations can be cleared using this technique, and that the hardware cannot be misused to overwrite arbitrary memory locations. To do so, an address requested for a poison clear operation is compared against a list of known addresses with a valid poison status.

Figure 2:
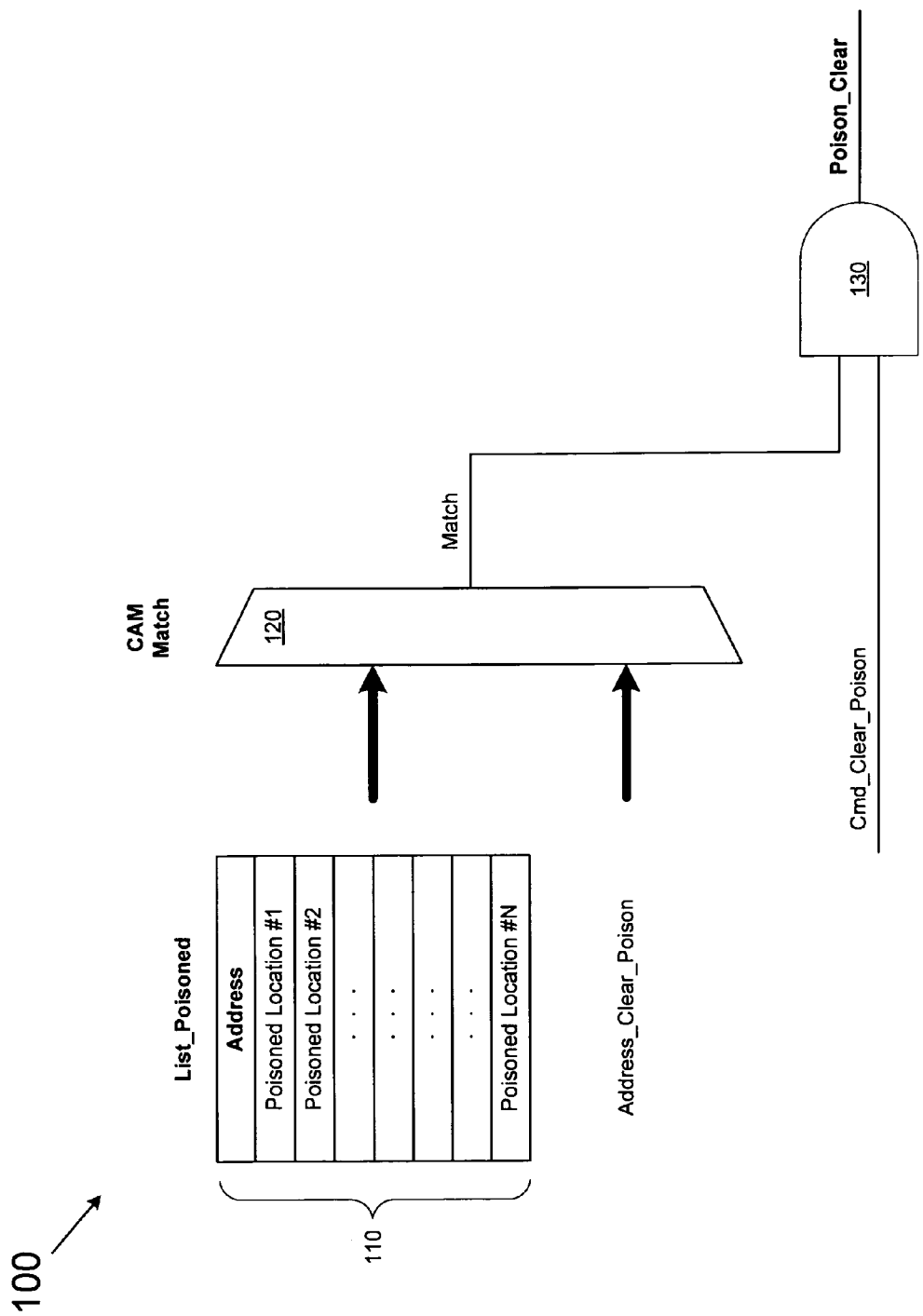
FIG. 2 is a block diagram of a portion of secure clear hardware in accordance with one embodiment of the present invention.

Referring now to FIG. 2, shown is a block diagram of a portion of secure clear hardware in accordance with one embodiment of the present invention, which may be present in a memory controller or other controller associated with a memory. As shown in FIG. 2, hardware 100 includes a poisoned list structure 110. This list may be implemented as a FIFO, queue, table, or other data structure. List 110 stores the addresses of lines in memory for which the poison status was TRUE on a previous read. Basically, when a poison error is logged, the address is stored in list 110. Each memory controller may maintain a list of such locations specific to the memory region that it controls.

This list may be a content addressable memory (CAM), i.e., which can compare all addresses in this list against an input address to determine if there is a match or not, as represented by CAM match 120. If there is a match, a poison clear command (Cmd_Clear_Poison) is allowed to proceed, via the poison clear signal output from logic gate 130, and a poison clear operation is performed, such as described in FIG. 1. At the end of this operation, an ACK status bit is set in a register, indicating successful completion. System software can poll this bit to determine if the poison clear operation succeeded. If there is no match, no poison clear is performed and the ACK status bit is cleared.

To simplify implementation and reduce area penalty, optimizations are possible. First, list 110 may store partial addresses. This may be acceptable since it is still a reasonable safeguard against random attacks, or random accidental overwrite requests. Alternately or in addition, a limited number of poisoned lines may be stored. This may be acceptable because beyond a certain limit, the likelihood of a hard failure in physical memory (e.g., dual in-line memory modules (DIMMs)) increases. In this scenario, a DIMM replacement is required, not a simple poison clear.

To enable a secure poison clear, a register can be defined to control the poison clear operation of the patrol scrub engine, as shown in Table 1 below.

TABLE 1

| Bit | Reset Value | Attribute | Description |
| --- | --- | --- | --- |
| [Addr_Size:2] | 0 | R/W | Address_Clear_Poison. Address of the memory location for which the Poison status indication needs to be cleared. Size is platform dependent and implementation specific. |
| 1 | 0 | R/W | Cmd_Clear_Poison. Initiates a Poison_Clear operation and clears the ACK bit. The operation may or may not complete successfully, depending on the CAM match with an address in List_Poisoned. 1 - Initiate Poison_Clear 0 - No effect Read returns last value written. |
| 0 | 0 | RO | ACK. Set by the hardware to indicate successful completion of a Poison_Clear operation. 1 - Successful Poison_Clear 0 - Failed Poison_Clear Cleared by the hardware when a new Cmd_Clear_Poison is receivedq. |

In one embodiment, this register is placed in protected control status register (CSR) space, which ensures that it is only accessible when the processor is in system management mode (SMM). A BIOS SMM handler may be responsible for configuring this register correctly, using the address information provided to it by the OS as noted above. Note in some implementations, only a single such control register is provided, such that only a single secure clear can be performed at a time, although other implementations may provide multiple registers. In other embodiments, a queue may provide for the storage of pending requests from the OS for locations present in list 110, and prior to insertion into the control register.

Embodiments thus provide a method and apparatus to accomplish secure poison clear, at minimal additional hardware cost, complexity, and power. Error recovery is a key reliability-availability-serviceability (RAS) feature intended to improve overall server availability. Multi-core trend is driving server consolidation, where many applications are run on a single machine using virtualization. In this environment, error isolation to a single virtual machine or application can improve performance. By providing a secure poison clear, there is no possibility of a double exception while attempting to clear the poison indication. Further, there are additional hardware safeguards provided to ensure that the poison clear operation is secure. In this way, a platform can continue running other VMs while hardware performs a secure clear associated with a memory location of a single VM.

Figure 3:
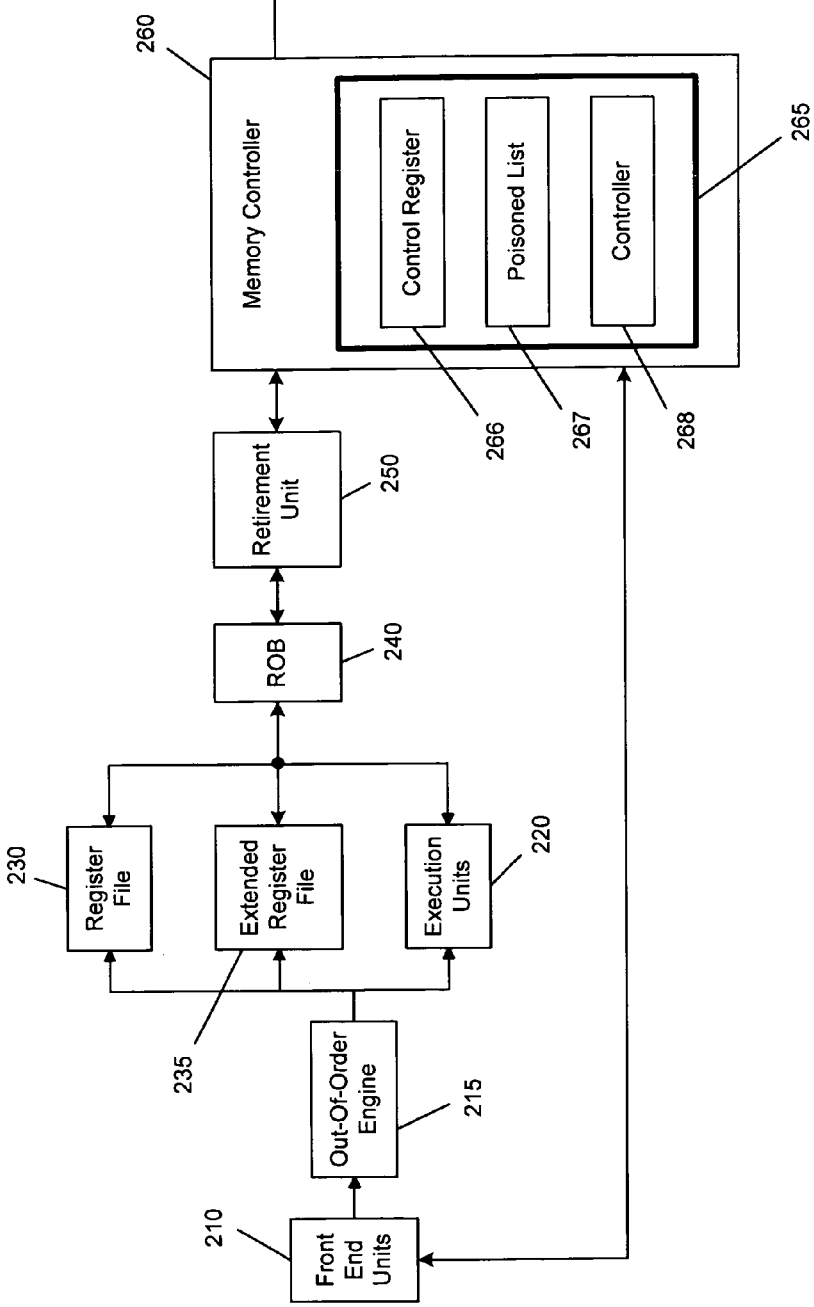
FIG. 3 is a block diagram of a processor in accordance with one embodiment of the present invention.

Referring now to FIG. 3, shown is a block diagram of a processor in accordance with one embodiment of the present invention. As shown in FIG. 3, processor 200 may be a multi-stage pipelined out-of-order processor. Processor 200 is shown with a relatively simplified view in FIG. 3 to illustrate various features used in connection with a secure poison clear operation as described above. Note that while FIG. 3 shows only a single processor core, embodiments may be implemented in multi-core processors having multiple cores.

As shown in FIG. 3, processor 200 includes front end units 210, which may be used to fetch macro-instructions to be executed and prepare them for use later in the processor. For example, front end unit 210 may include an instruction prefetcher, and an instruction decoder, along with storage. The instruction prefetcher may fetch macro-instructions from memory and feed them to an instruction decoder to decode them into primitives, i.e., micro-operands (μops) for execution by the processor.

Coupled between front end units 210 and execution units 220 is an out-of-order (OOO) engine 215 that may be used to receive the micro-instructions and prepare them for execution. More specifically, OOO engine 215 may include various buffers to re-order micro-instruction flow and allocate various resources needed for execution, as well as to provide renaming of logical registers onto storage locations within various register files such as register file 230 and extended register file 235. Register file 230 may include separate register files for integer and floating point operations. Extended register file 235 may include extended registers such as XMM registers (e.g., 128-bit registers) and/or YMM registers (e.g., 256-bit registers).

Various resources may be present in execution units 220, including, for example, various integer, floating point, and single instruction multiple data (SIMD) logic units, among other specialized hardware. After micro-instructions are executed in execution units 220, results may be provided to back end units such as a reorder buffer (ROB) 240. ROB 240 may receive entries regarding various instructions and act to reorder results of the instructions after execution in execution units 220, as well as to merge the results of loading and store operations. As further shown in FIG. 3, ROB 240 may be coupled to a retirement unit 250, which may operate to retire instructions executed out-of-order back into retirement order, i.e., program order and/or to handle exception or other processing for errors as indicated.

As further shown in FIG. 3, a memory controller 260, which may be an integrated memory controller of processor 200 may act as an interface between the back end portions of processor 200 and a memory subsystem, represented in part by a cache memory 270. Memory controller 260 may further be coupled to front end units 210 to receive misses from instruction and data caches, and to provide such information back thereto. Memory controller 260 may include, in one embodiment, logic 265 which may include hardware, firmware, software or combinations thereof to perform secure clear operations for poisoned memory locations within cache memory 270 or other portions of a memory subsystem. As such, controller 268 may include a patrol scrubber for cache memory 270. Similar such logic may be located in various memory controllers within a system to enable similar secure clear operations to clear such poison indicators that may be present in various portions of a memory hierarchy.

In the embodiment shown in FIG. 3, logic 265 may include a control register 266, which may be configured such as shown in Table 1, a poison list 267, and a controller 268, which may operate to securely clear a memory location, only if its poison bit is set, an indicator corresponding to the memory location is present in poison list 267, and only responsive to a clear command indicated by control register 266, accessed in SMM BIOS. Otherwise, controller 268 may prevent such a clear operation, to avoid a spurious exception, as well as to prevent a non-secure clear of non-poisoned locations.

As further shown in FIG. 3, ROB 240 is coupled to a cache 270 which, in one embodiment may be a low level cache (e.g., an L1 cache) although the scope of the present invention is not limited in this regard. From cache 270, data communication may occur with higher level caches, system memory and so forth. While shown with this particular implementation in the embodiment of FIG. 3, the scope of the present invention is not limited in this regard.

Figure 4:
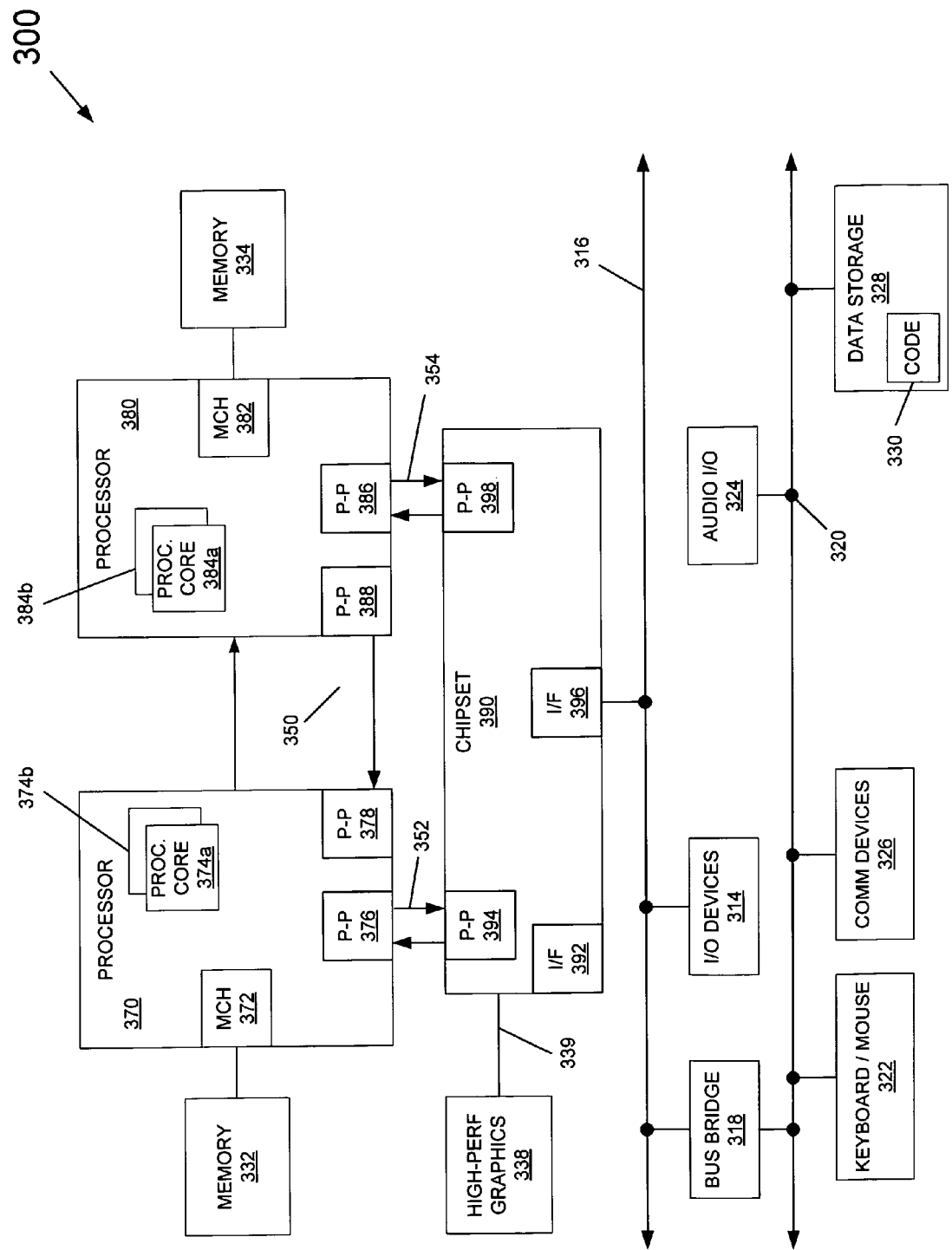
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 300 is a point-to-point interconnect system, and includes a first processor 370 and a second processor 380 coupled via a point-to-point interconnect 350. As shown in FIG. 4, each of processors 370 and 380 may be multicore processors, including first and second processor cores (i.e., processor cores 374a and 374b and processor cores 384a and 384b).

Still referring to FIG. 4, first processor 370 further includes a memory controller hub (MCH) 372 and point-to-point (P-P) interfaces 376 and 378. Similarly, second processor 380 includes a MCH 382 and P-P interfaces 386 and 388. As shown in FIG. 4, MCH's 372 and 382 couple the processors to respective memories, namely a memory 332 and a memory 334, which may be portions of main memory (e.g., a dynamic random access memory (DRAM)) locally attached to the respective processors. MCHs 372 and 382 may include hardware in accordance with an embodiment of the present invention to enable secure clearing of poisoned bits associated with memory locations within the corresponding memories 332 and 334. As such, MCHs 372 and 382 may include various logic such as a patrol scrub engine, a poison list, and hardware to provide storage for a control register to receive a request to clear instruction and perform the clear, e.g., responsive to SMM BIOS code. First processor 370 and second processor 380 may be coupled to a chipset 390 via P-P interconnects 352 and 354, respectively. As shown in FIG. 4, chipset 390 includes P-P interfaces 394 and 398.

Furthermore, chipset 390 includes an interface 392 to couple chipset 390 with a high performance graphics engine 338. In turn, chipset 390 may be coupled to a first bus 316 via an interface 396. As shown in FIG. 4, various I/O devices 314 may be coupled to first bus 316, along with a bus bridge 318 which couples first bus 316 to a second bus 320. Various devices may be coupled to second bus 320 including, for example, a keyboard/mouse 322, communication devices 326 and a data storage unit 328 such as a disk drive or other mass storage device which may include code 330, in one embodiment. Further, an audio I/O 324 may be coupled to second bus 320.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a storage area to store an address of a memory location for which a request to clear an error indicator is received, a first indicator to indicate the request to clear, and a second indicator to indicate whether the clear was successful;
    a table to store a plurality of entries, each entry including an address of a memory location having an error indicator that indicates an error in data stored in the memory location that is uncorrectable; and
    a controller to access the storage area and to perform the clear if the address in the storage area corresponds to an entry in the table, and to otherwise prevent the clear.

2. The apparatus of claim 1, wherein the controller is to securely perform the clear by prevention of a machine check error during the clear, perform the clear in a system management mode (SMM), and prevent clearing of a memory location not having an error indicator that indicates an error.

3. The apparatus of claim 1, wherein the apparatus comprises a memory controller.

4. The apparatus of claim 3, wherein the memory controller includes a scrub engine to overwrite the data stored in the memory location responsive to the request to clear.

5. The apparatus of claim 4, wherein the memory controller is to prevent a machine check error during the clear.

6. The apparatus of claim 5, wherein the memory controller is to perform the clear during a system management mode of a system.

7. The apparatus of claim 1, wherein the error indicator is a poisoned bit to indicate an uncorrectable error, and the request to clear is received from an operating system (OS) after recovery from a machine check error associated with the uncorrectable error and after termination of a virtual machine (VM) associated with a page including the memory location.

8. The apparatus of claim 7, further comprising secure basic input/output system (BIOS) to receive the request to clear from the OS and to access the storage area to set the first indicator and store the address.

9. A method comprising:
    receiving a request to clear an error indicator associated with a memory location from an operating system after recovery from an uncorrectable error and termination of a virtual machine associated with a page including the memory location, wherein the error indicator is a poisoned bit to indicate the uncorrectable error;
    confirming that an identifier for the memory location is present in a list of data locations having a set error indicator; and
    if so, writing overwrite data to the memory location and clearing the error indicator, otherwise preventing the writing of the overwrite data.

10. The method of claim 9, further comprising writing the identifier for the memory location in the list when the error indicator is set.

11. The method of claim 9, further comprising receiving the request to clear in a memory controller from an operating system.

12. The method of claim 11, further comprising accessing a control register in a system management mode to receive the request to clear and setting an acknowledgement indicator in the control register if writing the overwrite data was successful.

13. The method of claim 11, further comprising writing the overwrite data via a patrol scrub engine of the memory controller.

14. The method of claim 9, further comprising clearing the error indicator without causing a spurious exception.

15. A system comprising:
    a processor including an execution unit to execute instructions, a retirement unit to retire the instructions, and a memory controller to communicate with a memory, wherein the memory controller includes a control register to store an address within the memory for which a request to clear an error indicator is received, a first indicator to indicate the request to clear, and a second indicator to indicate whether the clear was successful, a table to store a plurality of entries each including an address within the memory having an error indicator that indicates an uncorrectable error associated with the address, and a logic to access the control register and perform the clear if the address in the control register corresponds to an entry in the table and to otherwise prevent the clear; and
    the memory coupled to the processor.

16. The system of claim 15, wherein the logic is to securely perform the clear in a system management mode (SMM), and prevent the clear at an address not having an error indicator that indicates an error.

17. The system of claim 15, wherein the logic includes a scrub engine to overwrite data stored at the address.

18. The system of claim 17, wherein the logic is to determine if an address of the request to clear is present in the table, and if not, to prevent the clear.

19. The system of claim 18, wherein the table is a content addressable memory (CAM) to receive the address and to determine if the address matches an entry therein.

20. The system of claim 15, wherein the error indicator is a poisoned bit to indicate the uncorrectable error, and the request to clear is received from an operating system (OS) after recovery from a machine check error associated with the uncorrectable error and after termination of a virtual machine (VM) associated with a page including the address.

* * * * *